United States Patent [19]

Krause

[11] Patent Number: 5,448,076
[45] Date of Patent: Sep. 5, 1995

[54] OPTICALLY-COUPLED DIFFERENTIAL LINE DRIVER GENERATING AN OPTICAL SIGNAL HAVING AT LEAST THREE STATES

[75] Inventor: Robert Krause, Menlo Park, Calif.

[73] Assignee: Siemens Components, Inc., Cupertino, Calif.

[21] Appl. No.: 129,646

[22] Filed: Sep. 30, 1993

[51] Int. Cl.[6] .............................................. G02B 27/00
[52] U.S. Cl. .................................... 250/551; 327/514; 359/154
[58] Field of Search ............ 250/551, 214 R, 214 DC, 250/214 PR, 237 G; 307/473, 311; 359/154, 180, 181, 187; 327/514

[56] References Cited

U.S. PATENT DOCUMENTS

| | | | |
|---|---|---|---|
| 4,150,286 | 4/1979 | Toll et al. | 250/214 DC |
| 4,295,226 | 10/1981 | Dombrowski | 445/618 |
| 4,321,487 | 3/1982 | Huykman | 307/311 |
| 4,873,448 | 10/1989 | Shirai | 250/551 |
| 5,008,957 | 4/1991 | Kiyono | 359/181 |
| 5,153,765 | 10/1992 | Grunziger | 359/180 |
| 5,175,641 | 12/1992 | Boerstler et al. | 359/180 |

OTHER PUBLICATIONS

NTIS Tech Notes (Aug. 1992), "Electrically Isolating Transmission-Line Driver", Springfield, VA, p. 542.

Primary Examiner—Stephone B. Allen
Attorney, Agent, or Firm—Joseph S. Codispoti

[57] ABSTRACT

By using the linear behavior of optical emitters, one can provide an optically-coupled data communications line driver that directly interfaces with differential circuits. A single emitter provides multi-level signals avoiding the need for separate discrete devices.

18 Claims, 2 Drawing Sheets

OPTICALLY-COUPLED DIFFERENTIAL LINE DRIVER GENERATING AN OPTICAL SIGNAL HAVING AT LEAST THREE STATES

FIELD OF THE INVENTION

This invention generally relates to data communications interfaces. Specifically, the invention is directed to optically-coupled data communications interfaces.

BACKGROUND OF THE INVENTION

Data line receivers inherently exhibit high impedance. Data line drivers, however, present a load on a communications line. As a consequence, a communications line serving several data line drivers may become unduly loaded and develop transmission problems. Electrically isolating inactive drivers can reduce the loading on the communications line.

Optocouplers are one class of devices used to transmit signal information between respective circuitry while maintaining electrical isolation therebetween. This is accomplished since optical signals, and not electrical signals, are passed between the light emitters and the photodetectors of an optocoupler, which are connected to respective portions of the circuitry. The size, cost and performance of optocouplers makes these devices ideal to implement isolation for data communication lines and interfaces.

However, optocouplers are usually single-ended or unbalanced, and have just two states: high and low. In contrast, noise-insensitive data formats are typically differential, offering a balanced signal with respect to a common reference. Further, to provide additional states beyond simply high and low, more devices are needed, i.e., one device for every two states.

It is therefore desirable to have a single channel optical interface device that will support differentially-formatted data and offer tri-state line termination characteristics. It is also desirable to provide an optical interface device having transfer characteristics that are independent of time, temperature, and variations in the efficiency of the optical source.

SUMMARY OF THE INVENTION

The aforementioned problems are obviated by the present invention which provides an optically-coupled differential line driver. The driver offers multiple level encoding using just a single optical source.

The driver may comprise two stages: an input stage, which includes a light emitter, such as a light emitting diode ("LED"), and an output stage, which includes a light receiver. To achieve a three state output, for example, the driver employs a multi-level optical modulation technique. Also, by using an optical feedback technique, the output power of the optical source, such as an LED, can be precisely controlled to create multiple optical flux levels. The light receiver in the output stage, in turn, decodes the multiple optical flux levels to provide n discrete output signals.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION

The devices described here are based in part on the technology used in the Siemens ® IL300 family of aluminum gallium arsenide (AlGaAs) linear optocouplers, discussed in the Siemens Optoelectronics Data Book 1993, pp. 5-115 through 5-122, and pp. 11-177 through 11-193. It should be understood that other devices can be used as well. Also, the optocouplers could be used with other types of electromagnetic radiation, such as ultraviolet light. Finally, although the specification describes a tri-state device, i.e., one having three states, the present invention is not so limited and a device to handle any number of states may be configured in accordance with the invention.

Figure 1:
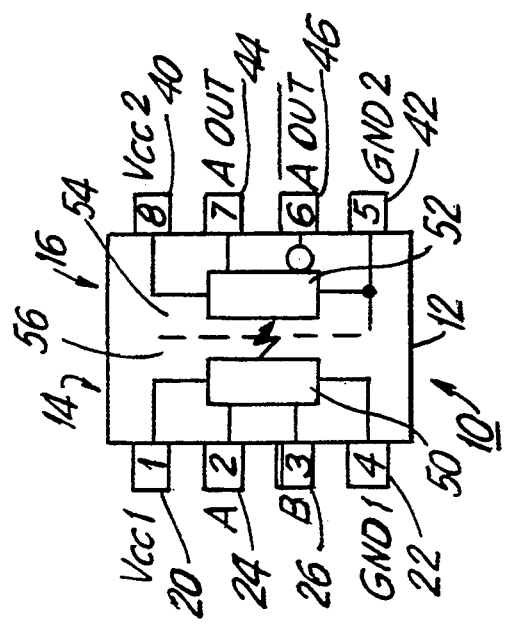
FIG. 1 is a schematic diagram of an optically-coupled differential line driver constructed in accordance with the present invention.

An optically-coupled differential line driver 10 constructed in accordance with the present invention is shown in the block schematic diagram of FIG. 1. The driver 10 is contained in a dual in-line package (DIP) 12, having eight pins, but any suitable packaging arrangement or device can be used. The driver DIP 12 has two sides, an input side 14 and an output side 16.

The input side 14 of the driver DIP 12 has a first voltage supply pin $V_{cc1}$ 20, a first ground pin $GND_1$ 22, a data input 24, and a tri-state input 26. The output side 16 of the driver DIP 12 has a second voltage supply pin $V_{cc2}$ 40, a second ground pin $GND_2$ 42, and first and second differential data outputs 44, 46.

The driver 10 contained within the DIP 12 comprises an input stage 50 and an output stage 52 separated by an optical cavity 54, depicted symbolically by a dashed line. As described in detail below, optical radiation 56 generated by the input stage 50 passes through the optical cavity 54 to the output stage 52. Note that the optical cavity 54 may be any suitable light conducting medium.

As shown, the input stage 50 is connected to the first voltage supply pin $V_{cc1}$ 20, the first ground pin $GND_1$ 22, the data input 24, and the tri-state input 26. The output stage 52 is similarly connected to the second voltage supply pin $V_{cc2}$ 40, the second ground pin $GND_2$ 42, and the first and second differential data outputs 44, 46.

Figure 2:
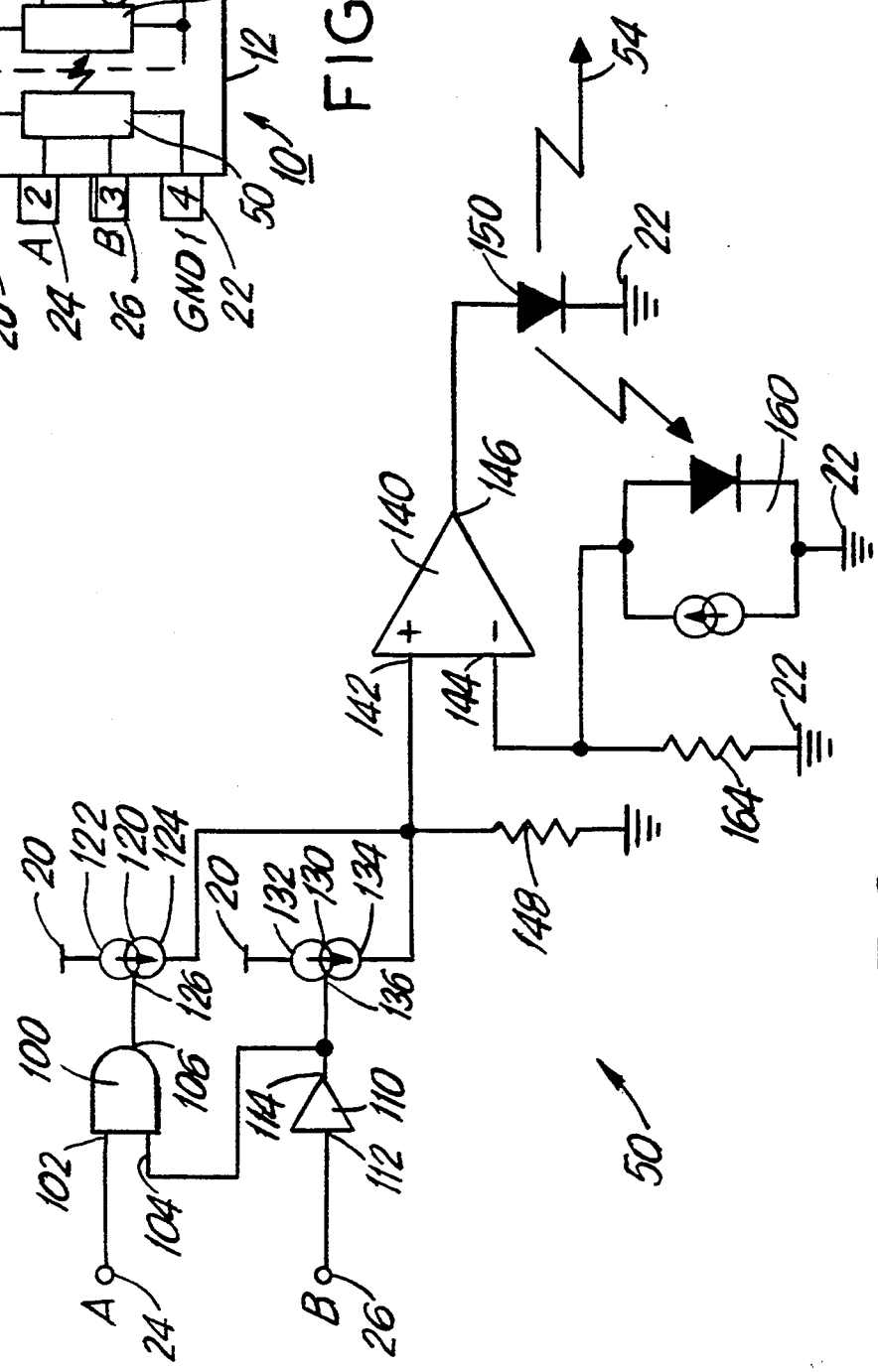
FIG. 2 is an electrical schematic diagram of an input circuit for the line driver of FIG. 1.

The input stage 50 for the line driver 10 is illustrated in the electrical schematic diagram of FIG. 2. The input stage 50 comprises has an AND gate 100 having first and second inputs 102, 104, and an output 106; a buffer 110 having an input 112 and an output 114; a first switched current source 120 having a voltage source input 122, an output 124, and a control input 126; and a second switched current source 130 having a voltage source input 132, an output 134, and a control input 136. The input stage 50 further comprises a differential amplifier 140 having a noninverting input 142, an inverting input 144, and an output 146; a bias resistor 148; a light emitter 150; a servo photodetector 160; and a servo bias resistor 164. The emitter 150 may be a low or high speed light-emitting diode (LED) that emits optical radiation when driven to the "on" state (i.e., is conducting). The servo photodetector 160 may be a photoresistor, an optically-controlled current source, or some other suitable device.

The first input 102 of the AND gate 100 is connected to the data input 24 of the driver DIP 12, the second input 104 is connected to the output 114 of the buffer 110, and the output 106 is connected to the control input of the first switched current source 120. The input 112 of the buffer 110 is connected to the tri-state input 26 of the driver DIP 12 and the output 114 is connected to the control input 136 of the second switched current source 130. The voltage source inputs 122, 132 of the switched current sources 120, 130 are connected to the voltage supply (via the first voltage supply pin $V_{cc1}$ 20 of the DIP 12), while the outputs 124, 134 are connected to the noninverting input 142 of the differential amplifier 140 and one end of the bias resistor 148. The other end of the bias resistor 148 is connected to ground (via the first ground pin $GND_1$ 22 of the DIP 12).

The output 146 of the differential amplifier 140 is connected to the light emitter 150 which, in turn, is connected to ground (via the first ground pin $GND_1$ 22). The inverting input 144 of the differential amplifier 140 is connected to a parallel network of the servo photodetector 160 and the servo bias resistor 164. The other end of the servo photodetector 160 and the servo bias resistor 164 are connected to ground (via the first ground pin $GND_1$ 22).

Figure 3:
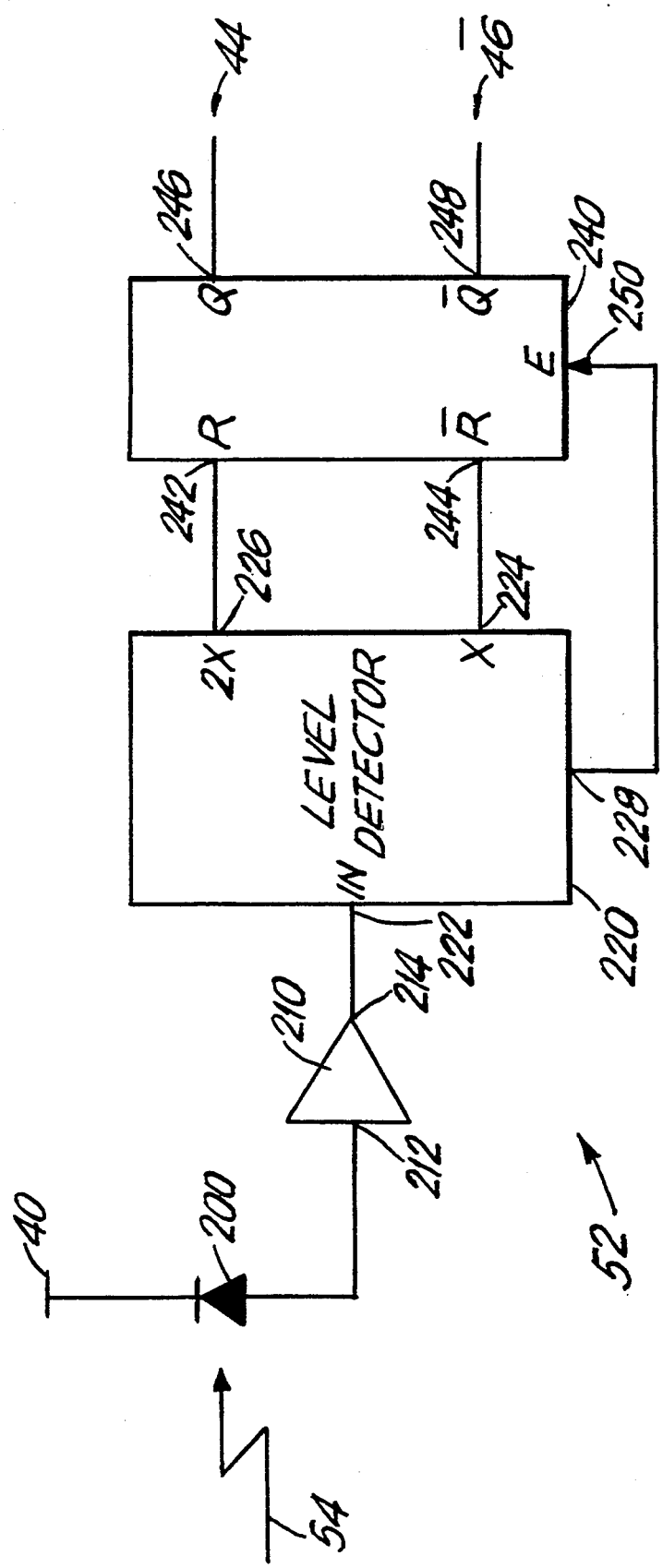
FIG. 3 is an electrical schematic diagram of an output circuit for the line driver of FIG. 1.

The optical radiation generated by the emitter 150 is directed across the optical cavity 54 to the output stage 52 for the line driver 10 illustrated in FIG. 3. The output stage 52 comprises an output photodetector 200; a buffer 210 having an input 212 and an output 214; a level detector 220 having an input 222, a first level output 224, a second level output 226, and a control output 228; and a flip-flop 240 having complementary inputs R and $\overline{R}$ 242, 244; complementary outputs Q and $\overline{Q}$ 246, 248, and a control input E 250.

The output photodetector 200 is connected between the voltage supply (via the second voltage source pin $V_{cc2}$ 40) and the input 212 of the buffer 210. The output 214 of the buffer 110 is connected to the input 222 of the level detector 220. The first and second level outputs 224, 226 of the detector 220 are connected to the complementary inputs R and $\overline{R}$ 242, 244 of the flip-flop 240, respectively. Also, the control output 228 of the detector 220 is connected to the control input E 250 of the flip-flop 240. The complementary outputs Q and $\overline{Q}$ 246, 248 are connected to the first and second differential data outputs 44, 46 of the driver DIP 12, respectively.

Note that as an alternative to the output photodetector 200 and the buffer 210 combination, a differential amplifier driven by two photodetectors of different gain and output could be used. Such an arrangement would improve the performance of the output stage 52 by controlling the upper and lower limits of the amplifier output. Also, instead of the differential circuit in the output stage 52 shown in the figure, a single-ended tri-state line driver could also be employed.

In operation, the line driver 10 is connected to a data communications line and functions as an interface between respective data circuitry. The driver DIP 12 may be soldered or otherwise connected to a printed circuit board that contains the data circuitry or circuitry connecting to the data circuitry. The input stage 50 receives two data/control input signals A and B from the respective driving data circuitry via the data input 24 and the tri-state input 26 of the DIP 12. The two input signals A and B, which are specifically received by the inputs 102, 112 of the AND gate 100 and the buffer 110, drive the AND gate 100 and buffer 110 logic combination that controls the two switched current sources 120, 130.

The first and second switched current sources 120, 130 operate in the following fashion. When the respective inputs 126, 136 receive high signals from the outputs 106, 114 of the AND gate 100 and the buffer 110, the current sources 120, 130 are driven into the "on" state and current flows in the direction of the arrows. This creates a voltage drop across the bias resistor 148. When the respective inputs 126, 136 receive low signals from the outputs 106, 114 of the AND gate 100 and the buffer 110, the current sources 120, 130 are driven into the "off" state and no current flows therefrom. Consequently, no voltage drop is created across the bias resistor 148.

When the AND gate 100 sends a low signal to the input 126 of the first current source 120 and the buffer 110 sends a high signal to the input 136 of the second current source 130, only the second current source 130 is driven on and current flows therefrom in the direction of the arrow. This creates a voltage drop across the bias resistor 148. Note, however, that current flowing only from the second current source 130 is less than the current that flows from both the first and second current source 120, 130. The respective attendant voltage drops across the bias resistor 148 have similar relationships. Also note that the particular logic combination of the AND gate 100 and the buffer 110 make it impossible for the first current source 120 to be turned on while the second current source 130 is turned off.

Consequently, there are three possible current levels: both current sources 120, 130 are off (no current flow), only the second current source 130 is on, and both current sources 120, 130 are on. The resultant outputs of the differential amplifier 140, and ultimately the LED emitter 150, are dependent on the value of the current flowing through the bias resistor 148. As a result, there are three corresponding outputs of the differential amplifier 140 and three corresponding levels of optical flux output generated by the emitter 150: no light, some level x of light, and twice the level x of light. The following table illustrates the foregoing:

| Input A | Input B | 1st Current Source 120 | 2nd Current Source 130 | LED Emitter 150 |
|---------|---------|------------------------|------------------------|-----------------|
| 0 | 0 | off | off | off |
| 0 | 1 | off | on | x |
| 1 | 0 | off | off | off |
| 1 | 1 | on | on | 2x |

, where x = some level of optical flux.

where x=some level of optical flux.

The servo photodetector 160 senses the optical radiation generated by the emitter 150 and, in conjunction with the servo bias resistor 164, provides feedback to the differential amplifier 140. This arrangement insures that the optical flux output levels of the emitter 150 are effectively 0, x, and 2x, making it easier for the output stage 52 to discriminate the various optical output levels.

The optical radiation is directed across the optical cavity 54 and is received by the output photodetector 200 of the output stage 52. The radiation impinges on the output photodetector 200 which, in response thereto, permits current flow from the voltage supply to the buffer 210 and the level detector 220. The amount of current flow, however, is dependent upon the optical flux output level from the LED emitter 150. As a result, there are three corresponding current amounts received by the level detector 220: no current, a first amount $I_x$ of current and a second amount $I_{2x}$ of current.

When the LED emitter 150 does not generate any optical radiation, the level detector 220 receives no current flow from the voltage supply since the output photodetector 200 is not conducting. When the LED emitter 150 generates an optical flux output level x, the level detector 220 receives $I_x$ of current from the voltage supply since the output photodetector 200 is partially conducting. When the LED emitter 150 generates an optical flux output level $2_x$, the level detector receives $I_{2x}$ of current from the voltage supply since the output photodetector is fully conducting and acts as a short circuit.

The data outputs 224, 226 of the level detector 220, together with the enabling signal 228 control the complementary inputs R and $\overline{R}$ 242, 244 of the flip-flop 240, to provide the complementary outputs Q and $\overline{Q}$ 246, 248. As indicated in FIG. 3, the first level output 224 drives the complementary input $\overline{R}$ 244 when the level detector 220 receives $I_x$ of current and the second level output 226 drives the complementary input R 242 when the level detector 220 receives $I_{2x}$ of current. Neither complementary input 242, 244 is driven by the level detector 220 when no current is received. In response to these inputs, the complementary outputs Q and $\overline{Q}$ 246, 248 of the flip-flop 240 provide three levels of output signals: high (i.e., 1), low (i.e., 0), and a high impedance state.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A self-contained apparatus for optically isolating at least one discrete input from at least one discrete output, comprising:
   input means for generating an optical signal having at least three predetermined optical levels; and
   output means, responsive to the optical signals generated by the input means, for generating a signal having a plurality of states, where each state corresponds to one of the predetermined optical levels.

2. The apparatus as set forth in claim 1, wherein the input means includes a single optical emitter.

3. The apparatus as set forth in claim 1, wherein in one state of the output signal the output means presents a high impedance.

4. The apparatus as set forth in claim 1, wherein the output means comprises means for generating a differential signal.

5. The apparatus as set forth in claim 1, further comprising optical feedback means, responsive to the optical signals generated by the input means, for generating feedback.

6. The apparatus as set forth in claim 5, wherein the levels of the optical signals generated by the input means are set by the optical feedback means.

7. A system, comprising:
   means for conveying signals; and
   isolation means for optically isolating at least one discrete input from at least one discreet output and driving the means for conveying, the isolation means comprising
   input means for generating an optical signal having at least three predetermined optical levels; and
   output means, responsive to the optical signals generated by the input means, for generating a signal having a plurality of states, where each state corresponds to one of the predetermined optical levels.

8. The system as set forth in claim 7, wherein the input means includes a single optical emitter.

9. The system as set forth in claim 7, wherein in one state of the output signal the output means presents a high impedance.

10. The system as set forth in claim 7, wherein the output means comprises means for generating a differential signal.

11. The system as set forth in claim 7, wherein the isolation means further comprises optical feedback means, responsive to the optical signals generated by the input means, for generating feedback.

12. The system as set forth in claim 11, wherein the levels of the optical signals generated by the input means are set by the optical feedback means.

13. A method for optically isolating at least one discrete input from at least one discrete output, comprising the steps of:
   generating an optical signal at one of at least three predetermined optical levels; and
   in response to the optical signals, generating a signal at one a plurality of states, where each state corresponds to one of the predetermined optical levels.

14. The method as set forth in claim 13, wherein the step of generating an optical signal is performed by a single optical emitter.

15. The method as set forth in claim 13, wherein the step of generating a signal comprises the step of presenting a high impedance as a state of the output signal.

16. The method as set forth in claim 13, wherein the step of generating a signal comprises the step of generating a differential signal.

17. The method as set forth in claim 13, further comprising the step of generating optical feedback in response to the optical signals.

18. The method as set forth in claim 17, wherein the levels of the optical signals are set by the optical feedback.

* * * * *

UNITED STATES PATENT AND TRADEMARK OFFICE
CERTIFICATE OF CORRECTION

PATENT NO. : 5,448,076
DATED : September 5, 1995
INVENTOR(S) : KRAUSE

It is certified that error appears in the above-indentified patent and that said Letters Patent is hereby corrected as shown below:

Column 6, claim 7, line 4, delete "discreet" and insert —discrete—.

Signed and Sealed this

Twenty-eighth Day of November 1995

Attest:

BRUCE LEHMAN

Attesting Officer

Commissioner of Patents and Trademarks